UNITED STATES PATENT OFFICE.

BARNETT F. DODGE, OF WOODBURY, NEW JERSEY, ASSIGNOR TO E. I. DU PONT DE NEMOURS & COMPANY, OF WILMINGTON, DELAWARE, A CORPORATION OF DELAWARE.

COMPOSITION OF MATTER.

1,357,852.  Specification of Letters Patent.  Patented Nov. 2, 1920.

No Drawing.  Application filed April 2, 1919. Serial No. 287,032.

*To all whom it may concern:*

Be it known that I, BARNETT F. DODGE, of Woodbury, in the county of Gloucester, and in the State of New Jersey, have invented a certain new and useful Improvement in the Composition of Matter, and do hereby declare that the following is a full, clear, and exact description thereof.

My invention relates particularly to a composition which is designed to be applied as a coating to articles, but especially dynamite cartridge shells, in order permanently to protect the same from moisture.

The object of my invention is to provide a composition by means of which articles, especially dynamite cartridge shells, may be coated, so that any interstices or crevices therein will be filled, and so that said articles may be effectively protected from the access of moisture. Another object of my invention is to provide a composition having considerable resiliency, which will not become brittle at low temperatures, which has a considerable viscosity at elevated temperatures, which will remain homogeneous at all temperatures to which it is ordinarily subjected, which has considerable toughness, which will adhere readily to said articles, which has sufficient fluidity when it is to be applied thereto without being too sticky, and which will cool and dry quickly.

While my invention is capable of being carried out in many different ways, for the purpose of illustration I shall hereinafter describe only certain ways of carrying out the same.

For example, a composition made in accordance with my invention may be applied to a dynamite cartridge shell which is made by making a cylindrical shell of paper by winding the same spirally, applying thereto a preliminary coating of melted paraffin wax, then inserting therein the charge of dynamite, and crimping the ends of the shell. A composition made in accordance with my invention may be comprised of:

| | |
|---|---|
| Paraffin wax | 52.5% |
| Rosin | 20.0% |
| Pitch | 17.5% |
| Carnauba wax | 10.0% |
| | 100.0% |

These constituents may have a variation of percentages as follows:

| | |
|---|---|
| Paraffin wax | 30-60 |
| Rosin | 10-30 |
| Pitch | 10-25 |
| Carnauba wax | 5-15 |

The pitch in this composition provides resiliency which will obviate any tendency of the composition to crack by reason of brittleness, increases the viscosity of this composition at atmospheric temperatures and prevents the other ingredients from separating out from the mixture while the cartridge is being coated. The rosin toughens the mixture at ordinary temperatures, and makes it have a better adherence to the cartridge shell. The paraffin wax renders the mixture more fluid when being applied, also enables the mixture to be applied at such a low temperature as not to be dangerous to the explosive, and prevents the mixture from becoming too sticky. The carnauba wax enables the material to cool and dry quickly, also increases its toughness at atmospheric temperatures, reduces its stickiness and lessens its viscosity at high temperatures.

When this composition is applied to the exteriors of such shells, it will fill in cracks which may have been produced in the ends of the shell by reason of the crimping thereof, and it effectively prevents the access of moisture to the charge of dynamite under all circumstances. Other waxes may be used in the place of the waxes above referred to, and other resins may be used in the place of the rosin above referred to, but not with all the beneficial results obtained, as stated hereinabove.

While I have described my invention above in detail, I wish it to be understood that many changes may be made therein without departing from the spirit thereof.

Claims:

1. A liquefiable composition for the waterproof sealing of wrapped articles comprising 10 to 25% of pitch, 30 to 60% of paraffin wax, 5 to 15% of carnauba wax and 10 to 30% of rosin.

2. A liquefiable composition for the waterproof sealing of wrapped articles comprising 17.5% of pitch, 52.5% of paraffin wax, 10.0% of carnauba wax and 20.0% of rosin.

In testimony that I claim the foregoing I have hereunto set my hand.

BARNETT F. DODGE

Witnesses:
W. C. COPE,
A. T. CANBY.